United States Patent [19]

Andresen

[11] 4,210,030
[45] Jul. 1, 1980

[54] SERVO MOTOR

[75] Inventor: Jens N. Andresen, Sonderborg, Denmark

[73] Assignee: Danfoss A/S, Nordborg, Denmark

[21] Appl. No.: 898,100

[22] Filed: Apr. 20, 1978

[30] Foreign Application Priority Data

Apr. 20, 1977 [DE] Fed. Rep. of Germany ....... 2717468

[51] Int. Cl.² ..................... F16H 21/18; F01B 29/10; F02G 1/04
[52] U.S. Cl. .......................................... 74/43; 60/519; 60/523; 74/89; 74/99 R; 92/140
[58] Field of Search ............. 92/130 R, 117 R, 117 A, 92/140; 60/516, 519, 523; 74/42, 43, 89, 105, 99 R

[56] References Cited

U.S. PATENT DOCUMENTS

| 2,830,455 | 4/1958 | Harmon | 74/105 X |
|---|---|---|---|
| 2,838,944 | 6/1958 | Kendall | 74/99 |
| 2,895,165 | 7/1959 | Fry, Jr. | 74/105 X |
| 3,098,395 | 7/1963 | Haganes | 74/105 |
| 3,256,686 | 6/1966 | Lindberg, Jr. | 60/516 |
| 3,275,286 | 9/1966 | Wood et al. | 74/105 X |
| 3,421,379 | 1/1969 | Carroll | 74/89 X |
| 3,508,394 | 4/1970 | DeNagel et al. | 60/523 |
| 3,609,635 | 9/1971 | Harris | 60/516 |
| 3,797,324 | 3/1974 | Sheesley et al. | 74/99 |
| 3,838,604 | 10/1974 | Meister | 74/99 |

FOREIGN PATENT DOCUMENTS

| 201530 | 5/1955 | Australia | 92/130 R |
|---|---|---|---|
| 1016502 | 9/1957 | Fed. Rep. of Germany | 60/516 |
| 1065150 | 9/1959 | Fed. Rep. of Germany | 74/105 |
| 1115813 | 4/1956 | France | 74/99 |
| 276701 | 8/1930 | Italy | 92/140 |
| 532775 | 9/1955 | Italy | 74/105 |
| 610104 | 10/1960 | Italy | 74/43 |

Primary Examiner—Leslie Braun
Attorney, Agent, or Firm—Wayne B. Easton

[57] ABSTRACT

The invention relates to a servo motor assembly in which the linkage is provided between a linearly movable motor part and a rotatable member being controlled. The linkage includes two separate links and the arrangement prevents or minimizes lateral reaction forces from being applied to the linearly movable motor part which would cause undue wear on the bearings thereof.

4 Claims, 4 Drawing Figures

SERVO MOTOR

The invention relates to a servo motor comprising two telescopically displaceable motor parts of which the first motor part is stationary and the second motor part, which is solely mounted on the first part by way of the telescopic guide, adjusts an output member for driving an element, particularly a heating motor with a heatable expansible substance and resetting spring.

A heating motor is known in which the expansible substance arranged in a chamber is heatable by means of an electric heating resistor and rectilinearly displaces a piston upon expansion. This compresses a return spring which pushes the piston back into the chamber upon cooling of the expansible substance. The free end of the piston adjusts a rectilinearly displaceable valve shank.

It has also already been suggested to use as an output member for such a servo motor a rotatable output shaft so as to pivot servo members, e.g. a ventilating or throttle flap in air-conditioning plant. For this purpose the output shaft is provided with a drum on which a first pull member connected to the second motor part and a second pull member subjected to the return spring can be coiled and uncoiled. By means of the pull member, the servo motor is only loaded axially. However, the strength of the pull members and their active life are limited.

There are numerous possibilities for converting the axial motion of a servo motor to rotary motion, for example by means of a crank drive or a gear and rack drive. However, in these cases transverse forces occur which very soon destroy the telescopic guide of the two motor parts, which often consists of only a seal. One can prevent this only by means of an additional bearing for the free end of the second motor part for taking up the transverse forces.

In windscreen wiper drives it is known to connect a crank-driven push rod to the rotary shaft of the windscreen wiper by means of cross-linkage. This cross-linkage consists of two equally long coupling elements which are hinged at one end to two equally long lever arms secured to the rotary shaft and mutually offset by about 180° and are held at the other end to pivots arranged at a spacing on the push rod.

The invention is based on the problem of constructing a servo motor of the aforementioned kind as a pivoting drive.

This problem is solved according to the invention in that the output member is an output shaft rotatable through a limited angle, and that the second motor part is connected to the shaft by cross-linkage in which two equally long coupling elements are at one end hinged to two equally long lever arms which are secured to the output shaft and angularly offset to one another and at the other end held to pivots which are movable with the second motor part and are mutually offset in its direction of movement.

In this construction, the cross-linkage converts the axial motion of the second motor part to a substantially proportional rotary motion of the output shaft. The cross-linkage has the additional advantage that within a limited rotary angle it effects extremely accurate straight-line motion of the second motor part. Consequently, with adequately long coupling elements, the transverse forces occurring at the telescopic guide are so low that there is no danger of damage through wear. Even with large servo forces no additional bearing is therefore required for the free end of the second motor part. Altogether, one therefore obtains a very simple construction with a long expected life which is also suitable for larger servo forces.

If the structural size is to be kept small, the coupling elements must be short and the spacing of the pivots small. In this case a torque that is no longer negligible is produced by the forces occurring at the pivots. In a development of the invention, this torque can be compensated by a counter-torque which is created if the central axis of the motor parts extends between the line connecting the pivots and the output shaft. The precise position of the central axis is determined so that the remaining torque is zero or a minimum over the entire servo distance. It is recommended that the central axis of the motor parts be disposed near the circle of movement of the lever arms.

The angle between the lever arms is preferably substantially 90°. This relatively small angle permits a pivotal motion of about 90° with minimum departures from the straight-line guide and it also permits the torque at the pivots to be kept relatively small.

From a constructional point of view, a very simple solution is obtained by a transmission element with a socket receiving the second motor part and a pressure finger which is laterally offset therefrom and carries the two pivots. Such a socket can for example receive as an insert the housing of a conventional heating motor that serves as the second motor part. At the same time the displacement of the pivots relatively to the motor axis is predetermined.

In a preferred embodiment, the transmission element is loaded by the return spring, the second motor part is a push fit in the socket, and the first motor part positively engages a stationary counterbearing. Such force connections are possible on the one hand because the return spring exerts the required forces in every operating position and on the other hand because there are no interfering transverse forces that have to be transmitted through the force connections.

The transmission element desirably consists of two spaced surface portions between which the coupling elements are mounted. The two surface portions first of all provide a good bearing for the second motor part and secondly they form a lateral limit for the bearing of the coupling elements.

The lever arms may each consist of two bearing blocks between which the coupling elements are mounted, the one coupling element consisting of two pivoted arms at both sides of the other coupling element. This gives a very sturdy and symmetric arrangement of the cross-linkage.

Both coupling elements may each consist of two identical pivoted arms having one sidedly enlarged pivot lugs. Two enlarged pivot lugs therefore correspond to the spacing between the two surface portions. The enlargement of the pivot lugs is somewhat greater than the thickness of each pivoted arm. The identical construction for the pivoted arms facilitates rational production.

In a further development of the invention, the hinges of each coupling element may be disposed in the plane of movement of the respective other coupling element and both coupling elements may be arcuate. This gives a compact construction which nevertheless ensures that the one coupling element will not collide with the hinges of the other coupling element.

The invention will now be described in more detail with reference to an example illustrated in the drawing, wherein.

Figure 1:
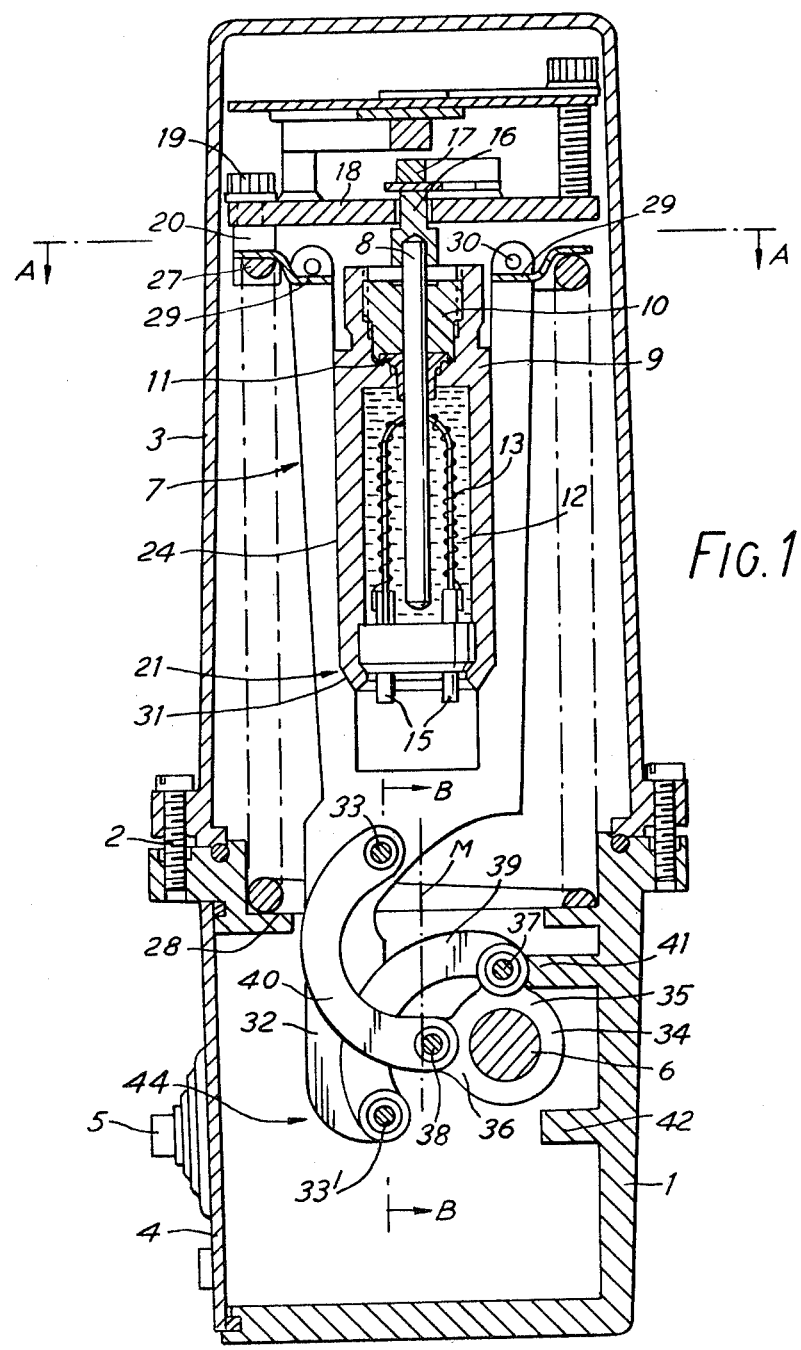
FIG. 1 is a longitudinal section through one embodiment of a servo motor according to the invention.
Figure 2:
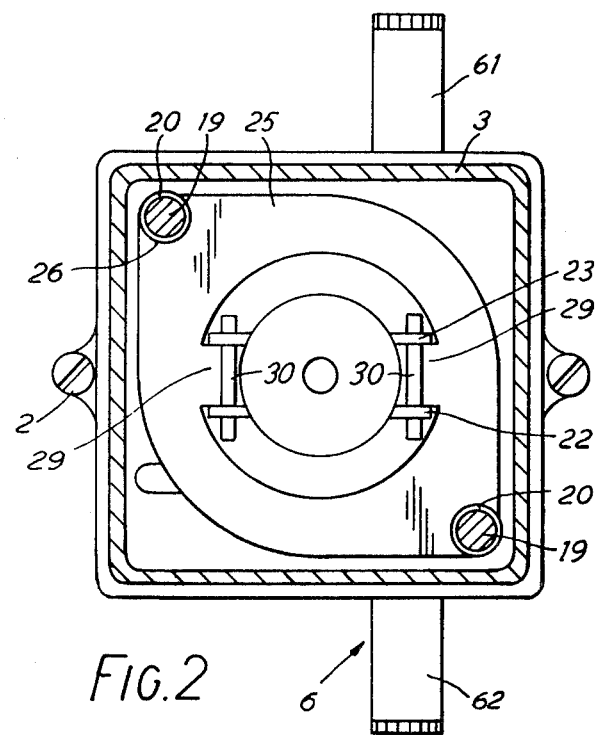
FIG. 2 is a section on the line A—A in FIG. 1.

A housing consists of a lower part 1 and an upper part 3 which is secured thereto by screws 2. The lower part has a removable side wall 4 which is in the form of an electric terminal plate and is provided with a bush 5. An output shaft 6 mounted in the lower part 1 has two ends 61 and 62 externally of the housing serving to connect a servo member, e.g. a throttle flap in an air supply passage, a pivotable searchlight or the like or a position indicator.

A heating motor 7 has a piston as a first motor part 8 and a housing as a second motor part 9. This housing is closed by a cover 10 which holds a seal 11. The interior 12 is filled with an expansible substance which can be heated by an electric heating resistor 13. The seal 11 forms the telescopic guide between the two motor parts 8 and 9. The resistor 13 is energised by way of conductors 15 in dependence on the operating requirements.

The piston 8 is provided with a hood 16 of which the end face lies against a stationary counterbearing 17. This counterbearing can be slightly deflected and thereby switch off the heating current when excessively large forces occur. This counterbearing is mounted on a stationary plate 18 which is held at a particular level above the lower part 1 by means of stay bolts 19.

A transmission element 21 consists of two surface portions 22 and 23. These comprise a socket 24 for receiving the second motor part 9 with a push fit. A spring supporting plate 25 provided at the upper end comprises two recesses 26 in which there are held plastics bushes 20 with which they can slide on the stay bolts 19. A return spring 27 is supported by this plate and its other end is held on a supporting face 28 of the lower part 1. The spring supporting plate comprises two lugs 29 which project inwardly. End sections of the surface portions 22 and 23 extend upwardly at both sides of each lug. These end sections are interconnected by transverse pins 30 so that the return spring 27 presses the transmission element 21 upwardly, whereby a step 31 of the socket 24 is pushed against the second motor part 9, the first motor part 8 is pushed against the hood 16 and the latter is pushed against the counterbearing 17.

The transmission element comprises a pressure finger 32 which is laterally offset relatively to the central axis M of the heating motor 7. Two pivots 33 and 33' superposed at an axial spacing are formed on the pressure finger. The shaft 6 is provided with a sleeve 34 having two equally long lever arms 35 and 36 which are mutually offset by 90° and likewise each carry a pivot 37 or 38. A first coupling element 39 extends between the pivots 33' and 37 and a second equally long coupling element 40 extends between the pivots 33 and 38. Both coupling elements are curved so that they will not interfere with the pivot 37 or 38 of the respective other coupling element. The pivots 33 and 33' on the pressure finger 32 are offset relatively to the central axis M of the heating motor 7. Further, this central axis M extends somewhat beyond the circle of movement of the pivots 37 and 38. It here intersects the point of engagement of the imaginary moment arm that can be calculated from the moments transmissible by way of the coupling elements. The rotary angle of the shaft 6 is restricted to about 90° by means of abutments 41 and 42 fixed with respect to the housing.

Figure 3:
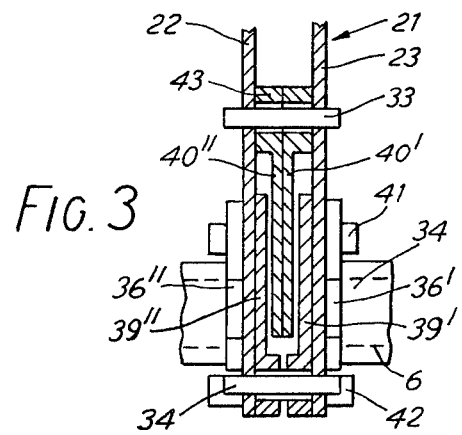
FIG. 3 is a fragmentary section on the line B—B in FIG. 1.

As will be evident from FIG. 3, the lever arm 36 consists of two bearing blocks 36' and 36''; the same applies to the lever arm 35. The coupling elements 39 and 40 each consist of two pivoted arms 39', 39'' and 40', 40'', respectively, disposed between the surface portions 22 and 23 of the transmission element 21. All pivoted arms possess enlarged pivot lugs 43 directed inwardly in the case of the pivoted arms of the coupling element 39 and outwardly for the pivoted arms of the coupling element 40, so that the pivoted arms of the coupling elements are arranged symmetrically, namely the pivoted arms 39' and 39'' between the surface portions 22 and 23 and the pivoted arms 40' and 40''. All the pivoted arms are identical. The pressure finger 32, the coupling elements 39 and 40 as well as the lever arms 35 and 36 form cross-linkage 44 which converts the axial motion of the second motor part 9 to rotary motion of the output shaft 6.

In the unheated rest position, the arrangement has the position shown in FIG. 1. By heating the expansible substance 12, the second motor part 9 is displaced downwardly and, with the aid of the cross-linkage 44, turns the output shaft 6. Conversely, the pressure finger 32 and thus the transmission element 21 and the second motor part 9 are guided substantially rectilinearly by the cross-linkage 44, so that there is no danger of excessive loading of the telescopic guide represented by the seal 11. The limited torque produced because of the relatively short coupling elements 39 and 40 by resolving the forces at the pivots 33 and 33' is compensated by a torque produced by displacing the pivots 33 and 33' relatively to the central axis M, so that the residual torsional load is zero or at least negligible. When heating is terminated and the expansible substance cools correspondingly, the second motor part 9 returns to the rest position under the influence of the return spring 27. Desired intermediate positions can be maintained by intermittent switching on of the heating resistor 13.

In an embodiment where the radial spacing of the pivots 34 and 37 from the rotary axis of the output shaft amounted to 14 mm, the spacing of the pivots 33 and 33' from each other amounted to 37.7 mm and the spacing of their straight line connection from the rotary axis amounted to 24 mm, the central axis M extended 14.8 mm adjacent the rotary axis.

The principle of the invention is also applicable to other servo motors, e.g. servo motors operated by compressed air or pressure liquid where care must be taken that the telescopic guide is not subjected to transverse forces. The pressure may act in the driving or in the return direction; however, in the case of servo motors it is recommended that the arrangement be such that a controllable force is applied in only one direction.

I claim:

1. A servo motor assembly, comprising, a frame, two relatively movable motor parts with a movable part thereof having movement along a straight line parallel to a reference line which is fixed relative to said frame, a rotatable member rotatably mounted relative to said frame about an axis on one side of said reference line, said rotatable member having two angularly displaced pivots at equal radii from said axis of said rotatable member, said reference line being a distance from said axis greater than said radii, said movable part having two pivots spaced from each other and equally spaced from said reference line on the side thereof opposite from said rotatable member pivots, and two links intersectingly connected respectively between the pivots of said motor movable part and said pivots of said rotatable member.

2. A servo motor assembly according to claim 1 wherein said movable motor part has a central axis which coincides with said reference line.

3. A servo motor assembly according to claim 2 wherein said movable motor part has an elongated portion laterally offset from said central axis, said pivots of said motor movable part being on said elongated portion.

4. A servo motor assembly according to claim 1 where said rotatable member pivots are displaced 90 degrees from each other.

* * * * *